(12) United States Patent
Heidenreich

(10) Patent No.: US 7,281,371 B1
(45) Date of Patent: Oct. 16, 2007

(54) COMPRESSED AIR PUMPED HYDRO ENERGY STORAGE AND DISTRIBUTION SYSTEM

(75) Inventor: David C. Heidenreich, Akron, OH (US)

(73) Assignee: EBO Group, Inc., Sharon Center, OH (US)

( * ) Notice: Subject to any disclaimer, the term of this patent is extended or adjusted under 35 U.S.C. 154(b) by 0 days.

(21) Appl. No.: 11/509,433

(22) Filed: Aug. 23, 2006

(51) Int. Cl.
*F16D 31/02* (2006.01)
(52) U.S. Cl. .................................................... 60/398
(58) Field of Classification Search ................. 60/398, 60/408, 410, 412, 415; 91/4 R, 4 A
See application file for complete search history.

(56) References Cited

U.S. PATENT DOCUMENTS 3,677,008 A * 7/1972 Koutz ......................... 60/398
4,182,128 A * 1/1980 Gardner ....................... 60/398
4,206,608 A * 6/1980 Bell ............................. 60/398

* cited by examiner

*Primary Examiner*—F. Daniel Lopez
(74) *Attorney, Agent, or Firm*—Renner, Kenner, Greive, Bobak, Taylor & Weber

(57) ABSTRACT

A compressed air pumped hydro energy storage and distribution system includes a first reservoir of water and a second reservoir of air and water. An air pressure source, connected to the second reservoir, develops a pressure head in the second reservoir. A pump/turbine-motor/generator, received by the first reservoir, is connected to a regional energy grid. During peak demand periods, the pressure head forces water through the pump/turbine-motor/generator to generate power, delivered to the grid. During low demand periods, the pump/turbine-motor/generator pumps water back to the second reservoir, regenerating the pressure head. A third air reservoir interconnected with the second reservoir and a gas turbine generator can be used to generate power during peak demand periods. The reservoirs can be tunnels or abandoned mines, reinforced and sealed by pressure grouting and/or an internal liner, maintained well beneath the earth's surface and intersecting the path of the grid.

15 Claims, 4 Drawing Sheets

COMPRESSED AIR PUMPED HYDRO ENERGY STORAGE AND DISTRIBUTION SYSTEM

TECHNICAL FIELD

The invention herein resides in the art of power generation and energy storage and distribution and, more particularly, to systems employing compressed air or pumped water (hydro) as the energy storage and power generating medium. More particularly, the invention relates to a system combining the features of both compressed air and pumped hydro energy systems. More specifically, the invention relates to the provision of containment cavities or tunnels beneath the earth's surface, and in close proximity to a city or other region requiring energy, and in which the compressed air pumped hydro energy system is tied to the energy grid of the city or region.

BACKGROUND ART

The electric power grid systems in developed countries have a growing need for energy storage, especially as wind and solar power provide an increasing portion of energy requirements. To date, pumped hydro systems have provided most of the world's electric energy storage, but the best of these resources have been tapped and environmental concerns make new development difficult. Indeed, the electric energy storage capacity of most countries is less than 5% of their grid power capacity. Modern electric grid systems could operate more efficiently than present, if energy storage could be increased to 10-20% of grid power capacity. As the world moves toward renewable energy generation (e.g., wind and solar), the need for energy storage may eventually grow to over 30% of the grid power rating and may have to be sustainable for 8-12 hours.

Pumped hydro energy systems are a well known and widely used method of energy storage. They are similar to a hydroelectric generating plant, in that they typically include a controlled release reservoir and water turbines driving electric generators. The pumped hydro systems, however, go beyond a hydroelectric facility in that they provide a reservoir at the lower level and an electric motor-driven pump that can pump the water from the lower reservoir to the upper reservoir during times when the power companies have excess generating capacity, typically at night and on weekends. Newer pumped hydro systems use a combination pump/turbine-motor/generator that combines a reversible water turbine or pump and motor/generator into a single unit. The Frances type water turbine is typically used and is available in sizes from under 10 megawatts to over 200 megawatts. These units are extremely efficient, with round trip energy efficiencies that can exceed 80%.

A relatively new concept for energy storage is the compressed air system. These systems use large underground cavities or caverns to store compressed air. A motor-driven compressor at the ground surface compresses the air during times of excess generating capacity, and a gas turbine generator is then used to recover the energy, when needed. The compressed air cannot be used to simply drive an air motor generator due to the extreme cooling of the air as it expands through the turbine. Accordingly, known compressed air energy storage systems require the use of gas turbine driven generators to heat the compressed air and recover the energy. Such systems recover the energy of the compressed air primarily by increasing the power and efficiency of gas turbine generators. With normal gas turbines, nearly two-thirds of the energy is used to compress the air that is needed to burn the gas. With compressed air energy systems, the round trip energy efficiency can approach 80%, but the economies of this action depend upon the cost of the natural gas required to recover the energy.

It is particularly noteworthy that pumped hydro energy storage has advantages over compressed air systems, including the ability to start up quickly, provide "spinning reserves," and provide voltage and frequency regulation to stabilize the associated power grid.

While the prior art has employed both pumped hydro and compressed air energy storage systems with some success, it appears that a combined system, capitalizing on the benefits of each, has not been envisioned. Accordingly, there remains a need in the art for a compressed air pumped hydro energy system, utilizing both pumped water and compressed air to effect power generation and energy storage for application to the power grid of cities or other specified regions.

DISCLOSURE OF THE INVENTION

In light of the foregoing, it is a first aspect of the invention to provide a compressed air pumped hydro energy system that combines the structures and benefits of previously known pumped hydro and compressed air energy systems.

Another aspect of the invention is the provision of a compressed air pumped hydro energy system that improves the efficiency of previously known compressed air energy systems and pumped hydro energy systems, and which does so in a cost effective manner.

Still a further aspect of the invention is the provision of a compressed air pumped hydro energy system that can be substantially contained beneath the earth's surface, being unobtrusive to the surrounding environment.

A further aspect of the invention is the provision of a compressed air pumped hydro energy system that provides the advantages of pumped hydro system with regard to energy storage and power stabilizing without the need for mountainous regions and environmental concerns.

Still a further aspect of the invention is the provision of a compressed air pumped hydro energy system that is environmentally safe.

Yet another aspect of the invention is the provision of a compressed air pumped hydro energy system that is adaptive for use with preexisting caverns, mines or cavities beneath the earth's surface, and which can employ previously existing surface reservoirs.

An additional aspect of the invention is the provision of a compressed air pumped hydro energy system with multiple power generators distributed along a tunnel system such that energy can be selectively transferred along the path of the tunnel system.

Yet another aspect of the invention is the provision of a compressed air pumped hydro energy system that is reliable, durable, and long lived in use.

The foregoing and other aspects of the invention that will become apparent as the detailed description proceeds are achieved by a compressed air pumped hydro energy system interconnected with a regional energy grid, comprising: a first reservoir of water; a second reservoir of air and water; an air compressor; a pump/turbine-motor/generator received by said reservoir and connected to the regional energy grid; a water conduit interconnecting said pump/turbine-motor/generator with said second reservoir; and an air conduit interconnecting said compressor with said second reservoir.

DESCRIPTION OF DRAWINGS

For a complete understanding of the aspects, structures and techniques of the invention, reference should be made to the following detailed description and accompanying drawings wherein.

BEST MODE FOR CARRYING OUT THE INVENTION

Figure 1:
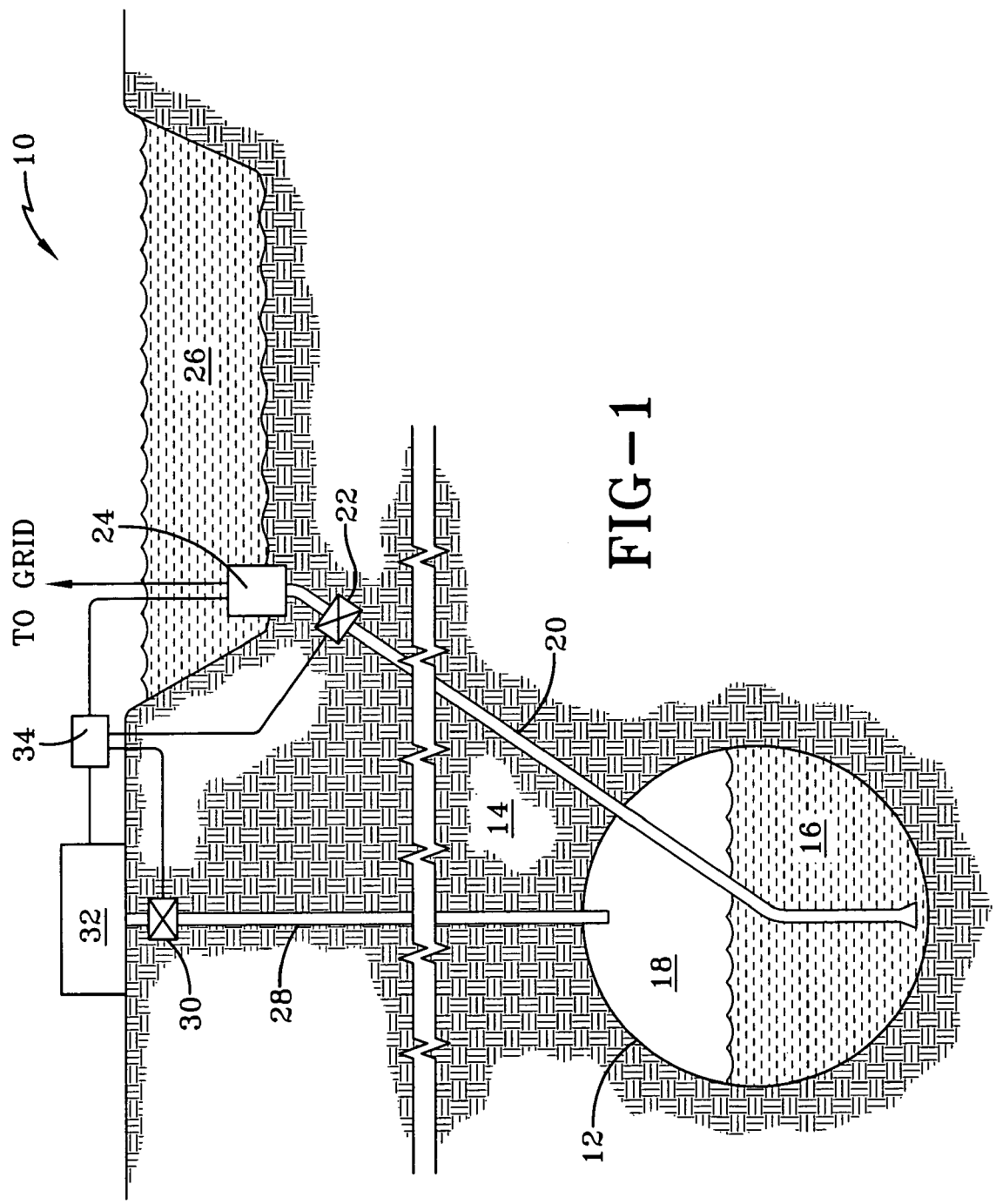
FIG. 1 is an illustrative sectional view of a first compressed air pumped hydro energy system made in accordance with the invention.

Referring now to the drawings and more particularly FIG. 1, it can be seen that a first embodiment of a compressed air pumped hydro energy system is designated generally by the numeral 10. As shown, the system 10 employs an appropriate cavity 12 within the earth 14 and below the surface thereof. It is contemplated that the cavity 12 would be an elongated cavity such as an abandoned mine or a tunnel excavated for this specific purpose. According to the invention, since the cavity 12 will be pressurized in use and contain water, the interior walls of the cavity 12 will typically be sealed by pressure grouting or the like. It is further contemplated that an appropriate membrane, such as an elastomeric member, might also be received within the cavity 12 and constrained by the walls thereof to provide the desired seal. The cavity or tunnel 12 has a lower portion 16, of varying capacity, that receives water, and an upper portion 18, receiving air. As will be appreciated, the volume of water and air and, hence, relative sizes of the portions 16, 18 will change during operation.

A conduit 20 extends from the lower interior of the cavity 12, through a valve 22, and to a pump/turbine-motor/generator assembly 24. The unit 24 is received within a reservoir 26 at the surface of the earth 14, being subjected to the atmosphere.

A conduit 28 extends from an uppermost portion of the cavity 12, through a valve 30 and to an air compressor 32 maintained at the surface of the earth 14. A controller 34 is operatively connected to the valves 22, 30 and to the pump/turbine-motor/generator 24 and compressor 32 to effect the desired operation.

In the operation of system 10, the water in the lower portion 16 of the cavity 12 is pressurized by the introduction of compressed air in the upper portion 18, with the compressed air being provided by the compressor 32 through the valve 30. Once the cavity 12 is pressurized, the valve 30 is closed and a pressure head is maintained in the cavity 12. In power generating application, the valve 22 is opened such that the compressed air pressure head in the upper portion 18 forces the water from the lower portion 16 through the conduit 20 and valve 22 and through the pump/turbine-motor/generator assembly 24 such that the turbine and generator generates electricity to be passed to the local service grid, as shown. In periods of low demand, the controller 34 causes the pump and motor portion of the unit 24 to force water from the reservoir 26 through the conduit 20 and valve 22 into the cavity 12 to replenish the lower portion 16 with water. This pumping of water into the portion 16 regenerates the pressure head in the portion 18 of the cavity 12. When sufficient water is replenished, the valve 22 is closed, awaiting the next power generating cycle. Accordingly, the system 10 can be employed to generate power during periods of peak demand, while replenishing the system during periods of low energy demand. Here, the compressor 32 will be used after the initial charge to compensate for air leakage.

Figure 2:
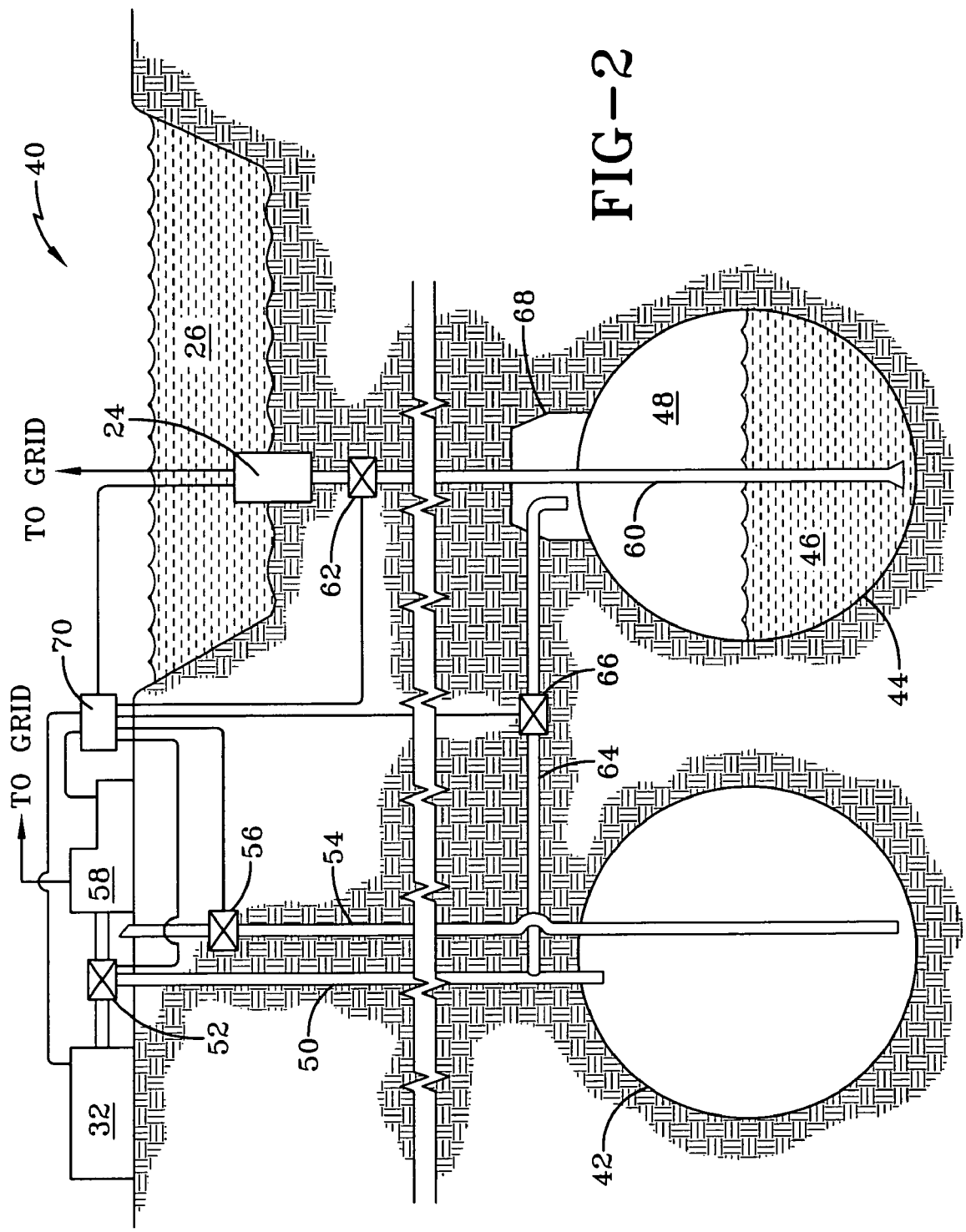
FIG. 2 is an illustrative cross sectional view of a second embodiment of the compressed air pumped hydro energy system of the invention.

With reference now to FIG. 2, a second embodiment of a compressed air pumped hydro energy system made in accordance with the invention is designated by the numeral 40. Here, a pair of cavities 42, 44 are provided within the earth 14. Again, the cavities may be abandoned mines or tunnels made specifically for the instant purpose. As above, the cavities 42, 44 are sealed by pressure grouting or by use of a lining or bladder or the like. The cavity 42 is provided for the sole purpose of receiving, maintaining and releasing compressed air. The cavity 44, similar to the cavity 12 of embodiment 10, is provided with a lower portion 46 for receiving water, and an upper portion 48 for receiving air.

As shown in FIG. 2, a conduit 50 passes from the compressed air reservoir 42 to an air compressor 32, which is connected to a gas turbine generator 58, with an appropriate valve 52 interposed therebetween. A conduit 54 extends from the bottom of the compressed air reservoir 42, through the valve 56, and to atmosphere. A conduit 62 extends from the pressurized air and water chamber 44, through a valve 62, and to a pump/turbine-motor/generator unit 24, which is received within a water reservoir 26 maintained at the surface of the earth 14.

A conduit 64 interconnects the air conduit 50 with a manifold 68 of the cavity 44, to allow the introduction of pressurized air into the cavity 44 under control of the valve 66, as shown.

A controller 70 interconnects each of the valves 52, 56, 62 and 66, as well as the compressor 32, gas turbine generator 58, and pump/turbine-motor/generator unit 24. It will be appreciated that the controller 70 can regulate the system 40 to store energy during low demand periods and to provide energy in peak demand periods by appropriately regulating the valves and the operative units 24, 32, 58. During low energy demand, the cavity 44 may be substantially filled with water in the lower portion 46, minimizing the head portion 48. This can be done by opening the valve 62 and causing the pump-motor portion of the unit 24 to pump water into the cavity 44. With the valves 62, 56 closed, and the valves 52, 66 opened, the compressor 32 may then cause air to be compressed in the cavity 42 and similarly in the head in the upper portion 48 of the cavity 44. The valve 52 may then be closed, awaiting demand for energy release. At such times, the controller 70 would cause the valve 62 to open, such that the pressure heads of the cavity 42 and the upper portion 48 of the cavity 44 forces water through the conduit 60 and valve 62 and through the turbine generator portion of the unit 24, creating electrical power to be passed to the grid, as shown.

When the water in the lower portion 46 of the cavity 44 has been substantially depleted, the valve 62 may be closed and the valve 52 activated, such that compressed air from the cavity 42 is forced through the conduit 50 to the gas turbine generator 58 for further power generation under control of the controller 70. This energy is also passed to the grid, as shown.

It is further contemplated that in high peak demand periods, both valves 52, 62 may be simultaneously opened, allowing the turbine-generator of the unit 24 and the gas turbine generator 58 to operate simultaneously and to pass power to the grid in unison. This provides the system operator with flexibility on the use of the gas turbine generators depending on the fluctuating cost of natural gas and value of the electricity generated.

In periods of low power demand, the lower portion 46 of the cavity 44 is replenished with water from the reservoir 26, through the pump-motor portion of the unit 24, the open valve 62, and through the conduit 60. Similarly, the compressor is used to fill the cavity 42 with compressed air through the conduit 50 and valve 52. At appropriate times during this regeneration cycle, the controller 70 may open the valve 56 to allow the compressed air within the cavity 42 to blow condensate from the bottom of the cavity 42 to atmosphere, through the conduit 54.

As shown in the embodiment 40 of FIG. 2, a gas turbine generator may be employed to increase the power generating capacity of the systems of the invention. Those skilled in the art will appreciate that the embodiment 10 of FIG. 1 could employ a gas turbine generator, as well.

Figure 3:
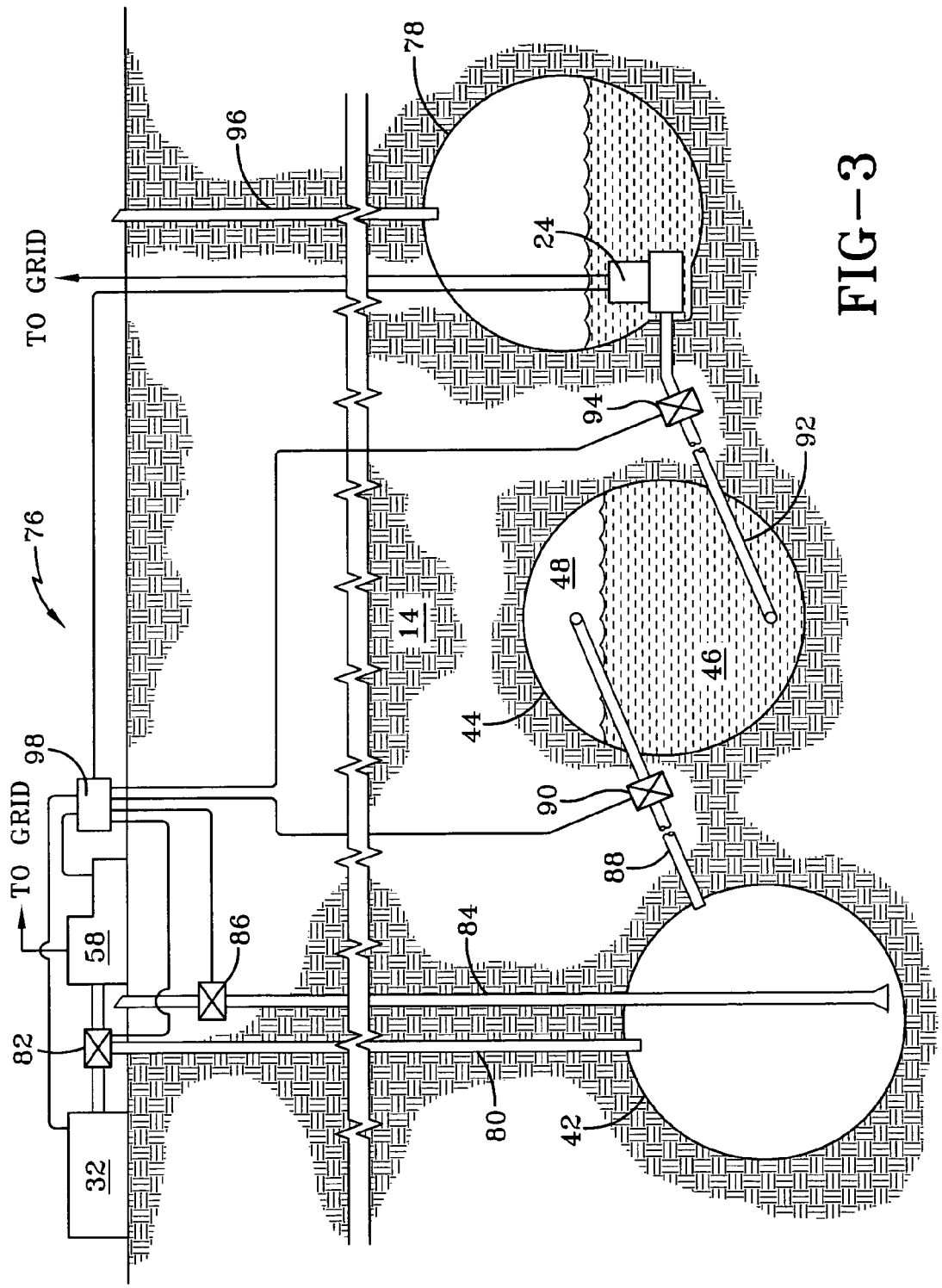
FIG. 3 is an illustrative cross sectional view of a third embodiment of the compressed air pumped hydro energy system of the invention.

With reference now to FIG. 3, a further embodiment of a compressed air pumped hydro energy system can be seen as designated by the numeral 76. Here again, a compressed air reservoir or cavity 42 and a air/water cavity 44, similar to the embodiment 40, is provided. Additionally, within the earth 14, there is provided a low pressure reservoir or cavity 78, replacing surface reservoir 26 of embodiments 10, 40.

As shown, a conduit 80 interconnects the compressed air reservoir cavity 42 with the compressor 32 and gas turbine generator through an appropriate valve 82. Similarly, a conduit 84 interconnects the bottom of the compressed air reservoir of the cavity 42 through a valve 86 to the ambient for purging condensate. A conduit 88 is interposed between and interconnects the cavity 82 and the cavity 44, allowing for the passage of compressed air from the cavity 42 through the conduit 88 under control of the valve 90 and into the upper portion 48 of the cavity 44.

A conduit 92 is interposed between the lower portion 46 of the cavity 44 and the pump/turbine-motor/generator unit 24, through the valve 94. Finally, a vent 96 is interposed between the ambient and the interior of the low pressure water reservoir of the cavity 78.

Again, a controller 98 is interposed between the operative units of the compressor 32, gas turbine generator 58, and pump/turbine-motor/generator assembly 24. The controller 98 also serves to control the opening and closing of the valves 82, 86, 90 and 94.

In operation, the embodiment 76 operates much as the embodiment 40, the benefit of the embodiment 76 being the elimination of the need for a surface reservoir and the reduced elevation of the water reservoir, now contained in a subterranean cavity 78, rather than at the surface of the earth 14. By controlling the valves and operative units through the controller 98, energy can be generated through the turbine generator portion of the unit 24 and through the gas turbine generator 58, both of which are interconnected to the grid, with such generation being either sequential or concurrent, as with the embodiment of FIG. 2.

The development and implementation of systems such as the embodiments of FIGS. 1-3 is readily achievable with existing technology. The required cavities may be presently existent or developed with state of the art mining or tunneling machinery and technology. To ensure the integrity of the cavities, pressure grouting techniques may be employed to reinforce interior walls and fortify weak rock formations and to seal the interior of the cavities against excessive leakage.

In operation, all three designs use compressed air to create an artificial elevation or "head" between the high pressure reservoirs and the low pressure reservoir. For example, 1,000 psi of air pressure is equivalent to a 2,307 feet head of water or reservoir height differential. Thus, in FIGS. 1 and 2, where the low pressure reservoir is at the surface, the water will flow up to spin the turbine and create power and must be pumped down to the high pressure underground reservoirs. If the depth of a 1,000 psi high pressure reservoir is 600 feet, there would be still the equivalent of a 1,707 foot head of water (740 psi) available to spin the turbine as the water flows up to the low pressure reservoir.

Figure 4:
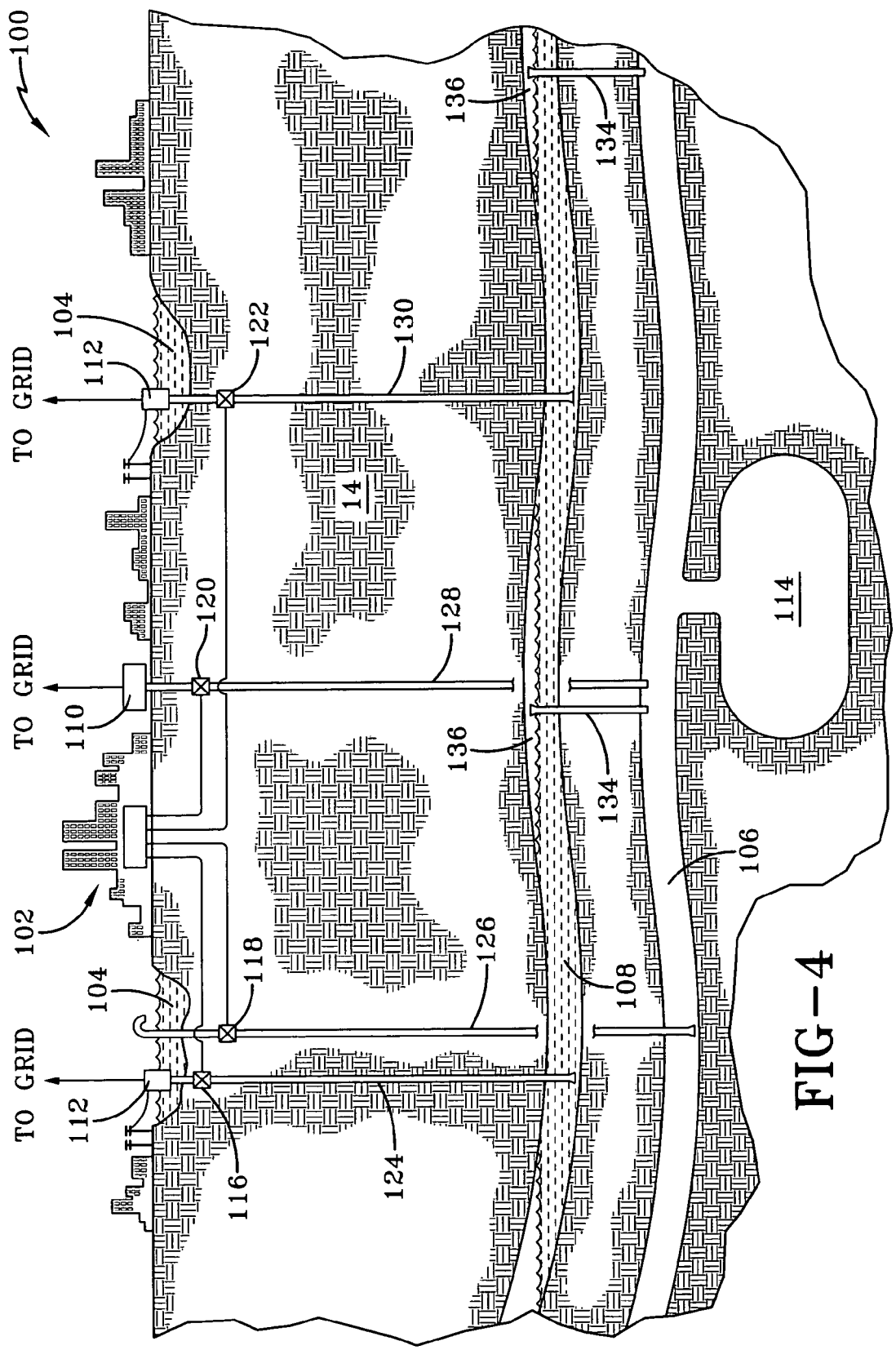
FIG. 4 is an illustrative cross-sectional view of the invention in implementation with the grid of a city.

With reference now to FIG. 4, an appreciation can be obtained regarding the implementation of a compressed air pumped hydro energy system made in accordance with the invention. As shown in FIG. 4, a metropolitan compressed air pumped hydro energy system is designated by the numeral 100, and shown in association with a city 102. As illustrated, a surface river, lake or other reservoir 104 is maintained in association with the city 102, although the invention contemplates a subterranean reservoir or cavity, as well. Within the earth 14, and well below the surface thereof, a compressed air tunnel 106 is provided in association with a pressurized water tunnel 108. In a preferred embodiment of the invention, the tunnels 106, 108 are maintained in close association with the power or energy grid of the city 102 for appropriate interconnection at various substations and the like. In general, it is contemplated that the tunnels 106, 108 might comprise a tunnel in form of an expanding helix or a series of concentric tunnels expanding outwardly as the city grows, and following paths making them readily accessible by substations, as needed.

As shown in FIG. 4, a compressed air energy system substation 110 is provided in association with the city 102 and, consistent with the embodiments of FIGS. 2 and 3, would include a compressor and gas turbine generator for the generation of power and storage of energy on the power grid. The compressed air energy system 110 is interconnected with the compressed air tunnel 106 through an appropriate conduit 128, controlled by valve 120. In like manner, pumped hydro energy system substations 112 are provided in association with the reservoir 104 and, consistent with the embodiments of FIGS. 1-3, include pump/turbine-motor/generator unit for the generation of power and the return of water to the tunnel 108, consistent with the embodiments previously discussed. The pumped hydro energy systems 112 are interconnected with the pressurized water tunnel 108 through conduits 124, 130 and respective valves 116, 122, as shown.

An auxiliary cavity 114 may be provided in direct communication with the compressed air tunnel 106, for purposes of increasing the capacity for compressed air storage. The auxiliary cavity 114 may be man made, or may be simply an abandoned mine, tunnel or the like.

As shown in FIG. 4, valves 116-122 are interposed within respective conduits 124-130 to effect the desired passage of air, water, or condensate, as the case may be. As illustrated, the conduit 124 interconnects the pressurized water tunnel 108 with the pumped hydro energy system 112 through the valve 116, while the other pumped hydro energy system 112 is so connected by means of the conduit 130 and the valve 122. The compressed air tunnel 106 is interconnected through the conduit 128 and valve 120 to the compressed air energy system substation 110. A condensate drain or blow-out conduit 126 interconnects a lowermost portion of the compressed air tunnel 106 to ambient, through the valve 118. A controller 132 interconnects the valves 116-122 for controlled actuation to effect the passage of water to and from the pressurized water tunnel 108 through the substations 112, and to pass compressed air to and from the compressed air tunnel 106 and the compressed air energy system substation 110 as shown. As presented earlier herein, condensate that may occur in the compressed air tunnel 106 may be blown out by means of the valve 118 and the condensate drain or conduit 126.

As is also apparent from the illustration of FIG. 4, conduits 134 interconnect the pressurized air tunnel 106 with head regions 136 within the pressurized water tunnel 108. These head regions 136 are developed by elevational changes of the tunnel 108, as shown.

In implementation, the system 100 can be employed by compressing the air within the tunnel 106, auxiliary cavity 114, and head regions 136 by means of the compressor maintained within the substation 110. This pressure head can be used to drive the water from the pressurized water tunnel 108 through the turbine generators of the substations 112 in periods of low power demand. In peak periods of demand, the compressed air turbine generator of the substation 110 may also be employed for generating power. In periods of low power or energy demand, the compressor of the substation 110 and the pumps/motors of the substation 112 may be employed to return compressed air to the tunnels 106 and pressurized water to the tunnel 108. The controller 110 controls the various valves for power generation during periods of high power demand, and energy storage during periods of low power demand.

The size of tunnels are contemplated as exceeding 20-40 feet in diameter such that flow losses are minimized, even over long distances of many miles. These will reduce or eliminate the need for unsightly power lines on expensive urban land. Moreover, the controller and the valve network can ensure that the energy is transferred to the area or substations where required.

Thus it can be seen that the aspects of the invention have been satisfied by the structure and process presented above. While in accordance with the patent statutes only the best mode and preferred embodiments of the invention have been presented and described in detail, the invention is not limited thereto or thereby. Accordingly, for an appreciation of the true scope and breadth of the invention reference should be made to the following claims.

What is claimed is:

1. A compressed air pumped hydro energy storage and distribution system interconnected with a regional energy grid, comprising:
    a first reservoir of water;
    a second reservoir of air and water contained within the earth;
    an air compressor;
    a pump/turbine-motor/generator connected to said first reservoir and connected to the regional energy grid;
    a water conduit interconnecting said pump/turbine-motor/generator with said second reservoir;
    an air conduit interconnecting said compressor with said second reservoir; and
    a third reservoir of air received within the earth and interposed between said second reservoir and said compressor, said third reservoir being interconnected with said second reservoir and said compressor through said air conduit.

2. The compressed air pumped hydro energy storage and distribution system according to claim 1, wherein said first and second reservoirs are sealed and reinforced by pressure grouting of earth formations receiving said reservoirs.

3. The compressed air pumped hydro energy storage and distribution system according to claim 1, further comprising one of a bladder and liner received within said first and second reservoirs, sealing against walls of said reservoirs.

4. The compressed air pumped hydro energy storage and distribution system according to claim 1, further comprising a gas turbine generator connected to the regional energy grid and to said third reservoir through said air conduit.

5. The compressed air pumped hydro energy storage and distribution system according to claim 4, further comprising a condensate conduit passing from a lower portion of said third reservoir to ambient for purging said third reservoir of condensate.

6. The compressed air pumped hydro energy storage and distribution system according to claim 5, wherein said first reservoir is received within the earth and vented to atmosphere.

7. The compressed air pumped hydro energy storage and distribution system according to claim 5, wherein said first reservoir is elevated above said second reservoir.

8. The compressed air pumped hydro energy storage and distribution system according to claim 7, further comprising valves interposed within said water conduit, air conduit and condensate conduit, said valves being connected to and controlled by a controller for selectively opening and closing said valves.

9. The compressed air pumped hydro energy storage and distribution system according to claim 8, wherein said controller is further connected to said compressor, gas turbine generator, and pump/turbine-motor/generator for controlling the sequencing and operation thereof.

10. The compressed air pumped hydro energy storage and distribution system according to claim 9, wherein said second and third reservoirs comprise tunnels beneath a region served by the regional energy grid, said tunnels intersecting a service path of the regional energy grid.

11. The compressed air pumped hydro energy storage and distribution system according to claim 10, wherein said second reservoir tunnel has a varying elevation such that uppermost portions of said tunnel define head regions in communication with said third reservoir tunnel for establishing air pressure heads within said head regions.

12. The compressed air pumped hydro energy storage and distribution system according to claim 11, wherein a plurality of water conduits interconnect said second reservoir tunnel with pump/turbine-motor/generators along the service path.

13. The compressed air pumped hydro energy storage and distribution system according to claim 12, wherein a plurality of air conduits interconnect said third reservoir tunnel with gas turbine generators along the service path.

14. The compressed air pumped hydro energy storage and distribution system according to claim 13, wherein said controller controls said valves to transfer energy from one part of the system to another.

15. A compressed air pumped hydro energy storage and distribution system interconnected with a regional energy grid, comprising:
- a first reservoir of water;
- a second reservoir of air and water contained within the earth;
- an air compressor;
- a pump/turbine-motor/generator connected to said first reservoir and connected to the regional energy grid;
- a water conduit interconnecting said pump/turbine-motor/generator with said second reservoir;
- an air conduit interconnecting said compressor with said second reservoir; and
- a gas turbine generator connected to the regional energy grid.

* * * * *